United States Patent [19]

Burke et al.

[11] Patent Number: 4,987,318

[45] Date of Patent: Jan. 22, 1991

[54] HIGH LEVEL CLAMP DRIVER FOR WIRE-OR BUSES

[75] Inventors: Ronald D. Burke; Carl J. Mattes, both of Manassas, Va.

[73] Assignee: International Business Machines Corporation, Armonk, N.Y.

[21] Appl. No.: 408,978

[22] Filed: Sep. 18, 1989

[51] Int. Cl.⁵ .................. H03K 17/16; H03K 19/092
[52] U.S. Cl. .................... 307/443; 307/559; 307/546; 307/362; 307/296.6; 307/296.3
[58] Field of Search ............. 307/443, 559, 561, 551, 307/546, 296.3, 296.6, 362, 264

[56] References Cited

U.S. PATENT DOCUMENTS

| | | | |
|---|---|---|---|
| 3,614,608 | 10/1971 | Giedd et al. | 324/73 |
| 3,633,016 | 1/1972 | Walker et al. | 235/153 |
| 3,649,851 | 3/1972 | Cohen | 307/270 |
| 3,821,645 | 6/1974 | Vinsani | 324/73 |
| 3,924,109 | 12/1975 | Jhu et al. | 235/153 |
| 3,946,245 | 3/1976 | McClaughry | 307/205 |
| 4,032,795 | 6/1977 | Hale | 307/205 |
| 4,217,502 | 8/1980 | Suzuki et al. | 307/205 |
| 4,251,737 | 2/1981 | Gaudenzi | 307/209 |
| 4,291,242 | 9/1981 | Schriber | 307/270 |
| 4,329,600 | 5/1982 | Stewart | 307/540 |
| 4,330,723 | 5/1982 | Griffith | 307/456 |
| 4,358,891 | 11/1982 | Roesner | 29/571 |
| 4,363,978 | 12/1982 | Heimbigner | 307/451 |
| 4,404,474 | 9/1983 | Dingwall | 307/260 |
| 4,450,370 | 5/1984 | Davis | 307/475 |
| 4,477,741 | 10/1984 | Moser, Jr. | 307/270 |
| 4,477,742 | 10/1984 | Janutka | 307/499 |
| 4,508,981 | 4/1985 | Dorler et al. | 307/542 |
| 4,556,976 | 12/1985 | Howarth | 371/25 |
| 4,594,519 | 6/1986 | Ohtani et al. | 307/443 |
| 4,609,834 | 9/1986 | Gal | 307/443 |
| 4,654,850 | 3/1987 | Rodrigues et al. | 371/25 |
| 4,682,050 | 7/1987 | Beranger et al. | 307/270 |
| 4,700,087 | 10/1987 | Stroberger | 307/546 |
| 4,752,701 | 6/1988 | Gonoi | 307/559 |
| 4,766,334 | 8/1988 | Warner | 307/540 |
| 4,803,383 | 2/1989 | Hirochi | 307/456 |
| 4,825,099 | 4/1989 | Barton | 307/270 |
| 4,871,931 | 10/1989 | Fitzpatrick | 307/443 |

Primary Examiner—David Hudspeth
Assistant Examiner—Andrew Sanders
Attorney, Agent, or Firm—John E. Hoel

[57] ABSTRACT

The drivers of a bus are provided with an internal positive voltage clamp, which insures that large positive voltage waves will not be launched down the bus. By increasing the output conductance of the driver when larger than desired voltage is detected at its output, higher voltage waves are prevented from developing on the bus.

10 Claims, 4 Drawing Sheets

HIGH LEVEL CLAMP DRIVER FOR WIRE-OR BUSES

This invention was made with Government support under contract No. F33615-84-C-1470 awarded by the U.S. Air Force. The Government has certain rights in this invention.

BACKGROUND OF THE INVENTION

1. Technical Field

The invention disclosed broadly relates to transistor circuits and more particularly relates to transistor driver circuits for buses.

2. Background Art

When driving wire-or buses, bus settling time has a major influence on system performance. It is impossible to terminate these buses by classical methods due to varying line lengths and varying impedance of modules connected to the bus. Other methods to decrease bus settling time must be used.

A typical bus structure is illustrated in FIG. 1. In this bus configuration, from two to 32 modules may be connected. Any combination of modules may be drivers and/or receivers. The driver/receiver relationship will change on a cycle-by-cycle basis to include the range from one driver and 31 receivers to 32 drivers. A module uses its drive output as its receiver input, since any particular module does not know if it is the only driver active for that particular cycle.

The existing method of attempting to properly terminate such a bus is to terminate each end of the bus with resistors which are equal to the loaded bus impedance of the bus. The loaded impedance of the bus is defined as:

$$ZL = ZO*SQRT(CO*SL/(CO*SL + CIN*\#DROPS)) \quad (1)$$

where:
- ZO is the characteristic impedance of the transmission line,
- CO is the per unit length capacitance of the transmission line,
- CIN is the equivalent capacitance of each drop on the bus,
- SL is the total line length of the bus (excluding stubs) and #DROPS is the total number of modules connected to the bus While this is a fair approximation if each bus drop presents only an invariant capacitance load, examination of FIG. 1 indicates that in the real world this is a coarse approximation at best. As modules go from driver/receiver to receiver only, the impedance at each bus drop changes rapidly. In addition, each bus drop has inductance associated with the input connector and power supply pins. Finally each bus drop has a length of transmission line from the module pin to the driver/receiver and each driver/receiver has inductance and capacitance associated with its own package. As system speeds go up, none of these effects are negligible.

In the practical case equation 1 gives an initial estimate of the correct end termination resistors and either experimental results or computer simulation is used to home in on the best value.

The drivers on this type of bus have to be similar to the normal open collector/drain driver. They must be capable of sinking all the current from both end termination resistors when the driver is the only one active. They must also be able to operate when multiple drivers are active at either driver output polarity. This requirement dictates unidirectional drive capability only, since if the drivers were bidirectional, any driver sinking current would have to sink all the up level drive capability of every other driver on the bus. Bidirectional drivers can be used on buses. This function is provided by tristate drivers. The use of tristate drivers requires a bus architecture which does not allow multiple drivers of different output polarity to be on concurrently. This requirement is not met in many architectures, such as those requiring multiple drop driver enables.

Consider the bus structure in FIG. 1 with a single driver on. The current this driver sinks is 2*(VBB-VDL)/RT.
where:
- VDL is the down level of the driver,
- RT is the termination resistor value and
- VBB is the resistor termination voltage.

When this driver attempts to turn off, the voltage wave created at the input to the transmission line on the driver module is 2*(VBB-VDL)*ZO/RT where ZO is the transmission line characteristic impedance. This voltage wave can have large amplitude if the ratio ZO/RT is large. This is usually the case with practical values of transmission line and termination resistors. The large voltage wave reflects as it encounters the various stubs and main line segments and creates severe ringing on the bus which elongates the bus settling time (the time at which all receivers on the bus can distinguish between a 1 and a 0). The apparently obvious but incorrect fix would be to increase RT. While this will certainly decrease the bus ringing it also increases the bus low-to-high transition time. In the prior art practice described above, this trade between bus ringing and bus rise time is exactly what is evaluated either experimentally o by computer simulation.

OBJECTS OF THE INVENTION

It is therefore an object of the invention to provide an improved high level clamp driver for a wire-or bus which does not require compromising bus settling time and bus rise time.

It is another object of the invention to provide an improved high level clamp driver for a wire-or bus which minimizes impedance changes on the bus.

It is a further object of the invention to provide an improved high level clamp driver for a wire-or bus which minimizes the effects of inductance and transmission line length changes as the drivers are switched.

SUMMARY OF THE INVENTION

These and other objects, features and advantages of the invention are accomplished by the high level clamp driver for a wire-or bus, disclosed herein. The invention provides the bus drivers with an internal positive voltage clamp which insures that large positive voltage waves will not be launched down the bus. By increasing the output conductance of the driver when larger than desired voltage is detected at its output, higher voltage waves are prevented.

BRIEF DESCRIPTION OF THE DRAWINGS

These and other objects, features and advantages of the invention will be more fully appreciated with reference to the accompanying figures.

DESCRIPTION OF THE BEST MODE FOR CARRYING OUT THE INVENTION

The elimination of the requirement to trade bus settling time against bus rise time is achieved by this invention. Prior art has attempted to eliminate some of the bus ringing by slowing the turn off of the drivers. This slows the slew rate at the driver output, keeping the driver on and presenting a lower impedance which can absorb reflections as they return from the various bus discontinuities. This prior art approach (a) slows down the possible bus performance and (b) is not effective for any reflections arriving after the driver has turned off.

In accordance with the invention, a better solution to the problem is to provide the drivers with an internal positive voltage clamp which insures that large positive voltage waves will not be launched down the bus in the first place. By increasing the output conductance of the driver when larger than desired voltage is detected at its output, higher voltage waves are prevented.

Figure 2B:
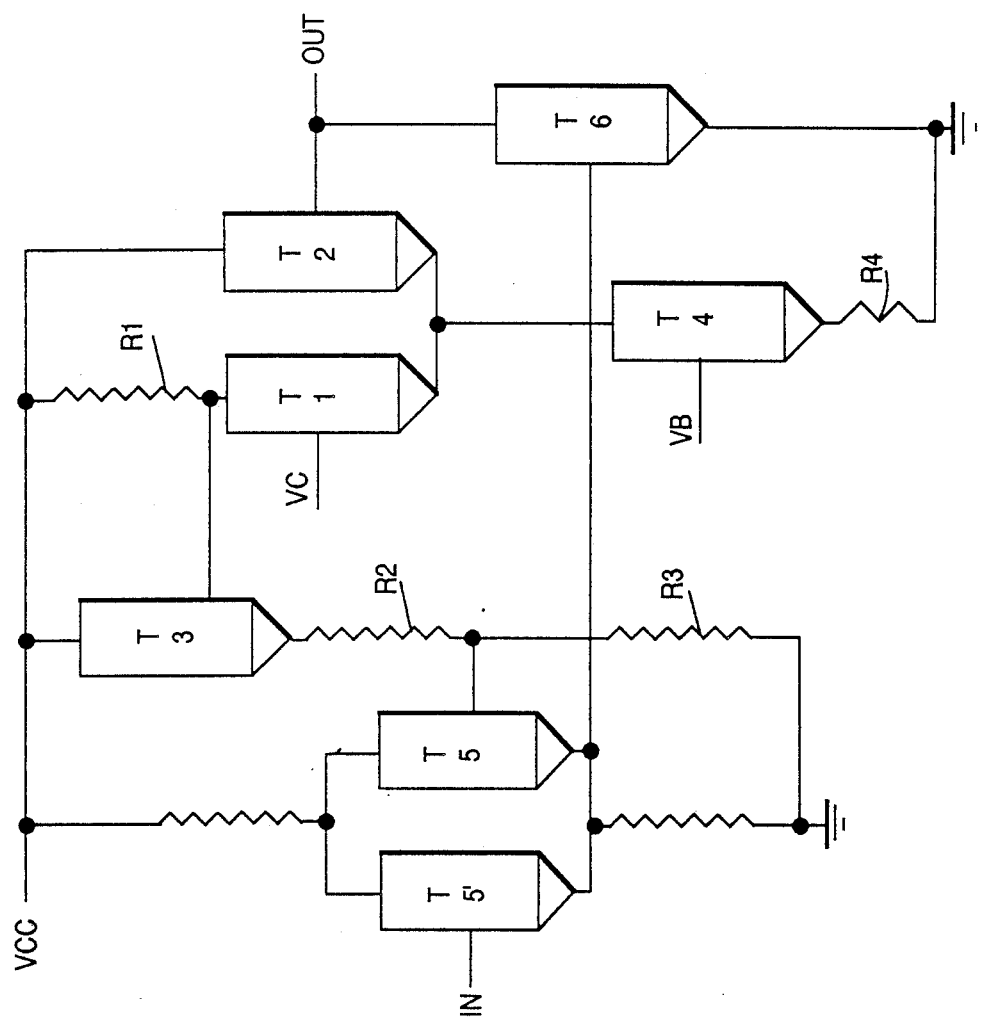
FIG. 2B is a second embodiment of the invention which uses an internally generated compare voltage as one input to a differential amplifier for the driver circuit.
Figure 2A:
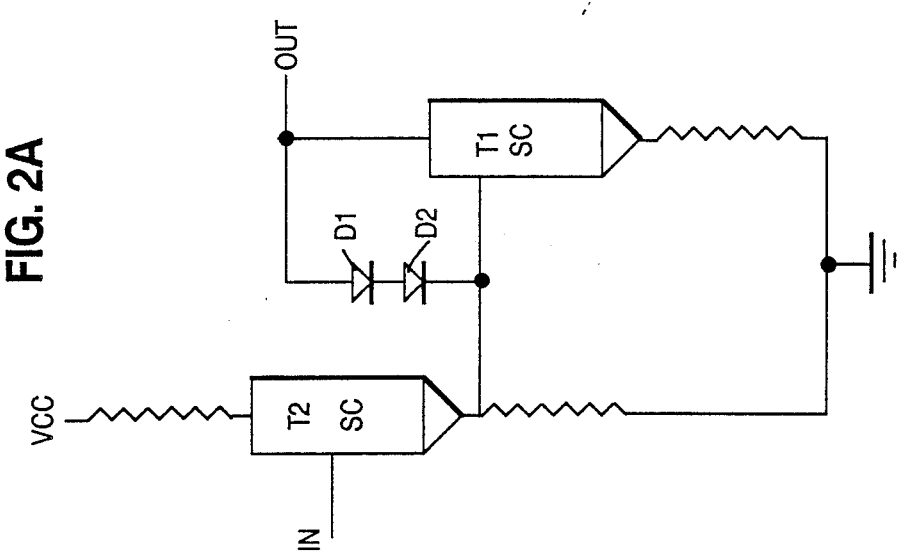
FIG. 2A is a first embodiment of the invention implementing a clamp by using a diode stack for the driver.

Two circuits to accomplish this are illustrated in FIG. 2. FIG. 2A implements the clamp by using a diode stack comprised of D1 and D2 to clamp the driver output transistor collector to its base. FIG. 2B uses an internally generated compare voltage VC as one input to a differential amplifier composed of T1 through T5 and R1 through R4. This amplifier is used to redrive the base of the output transistor if the driver output voltage exceeds VC. Many other configurations are possible.

Figure 3:
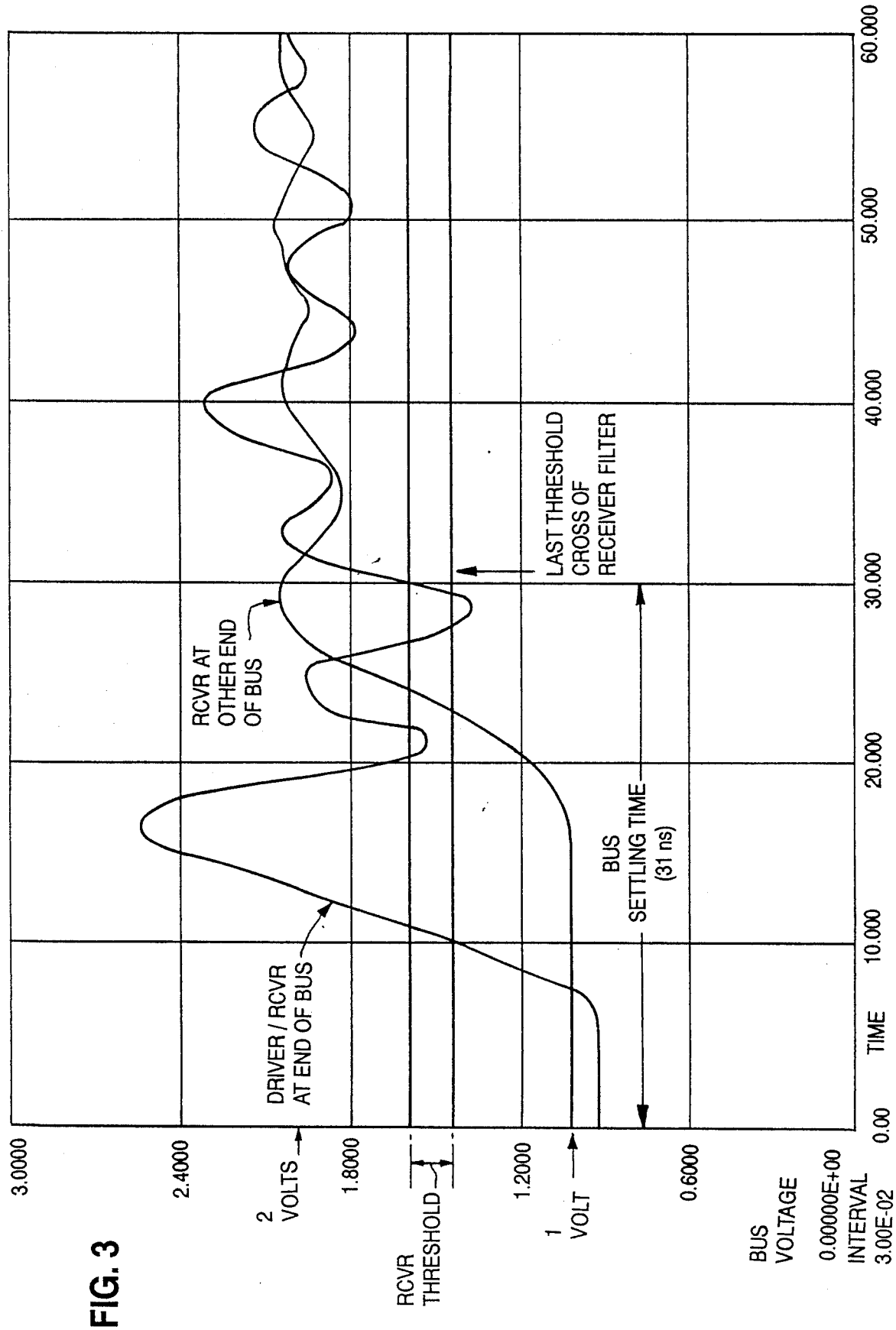
FIG. 3 is a waveform diagram of the prior art driver characteristics.
Figure 4:
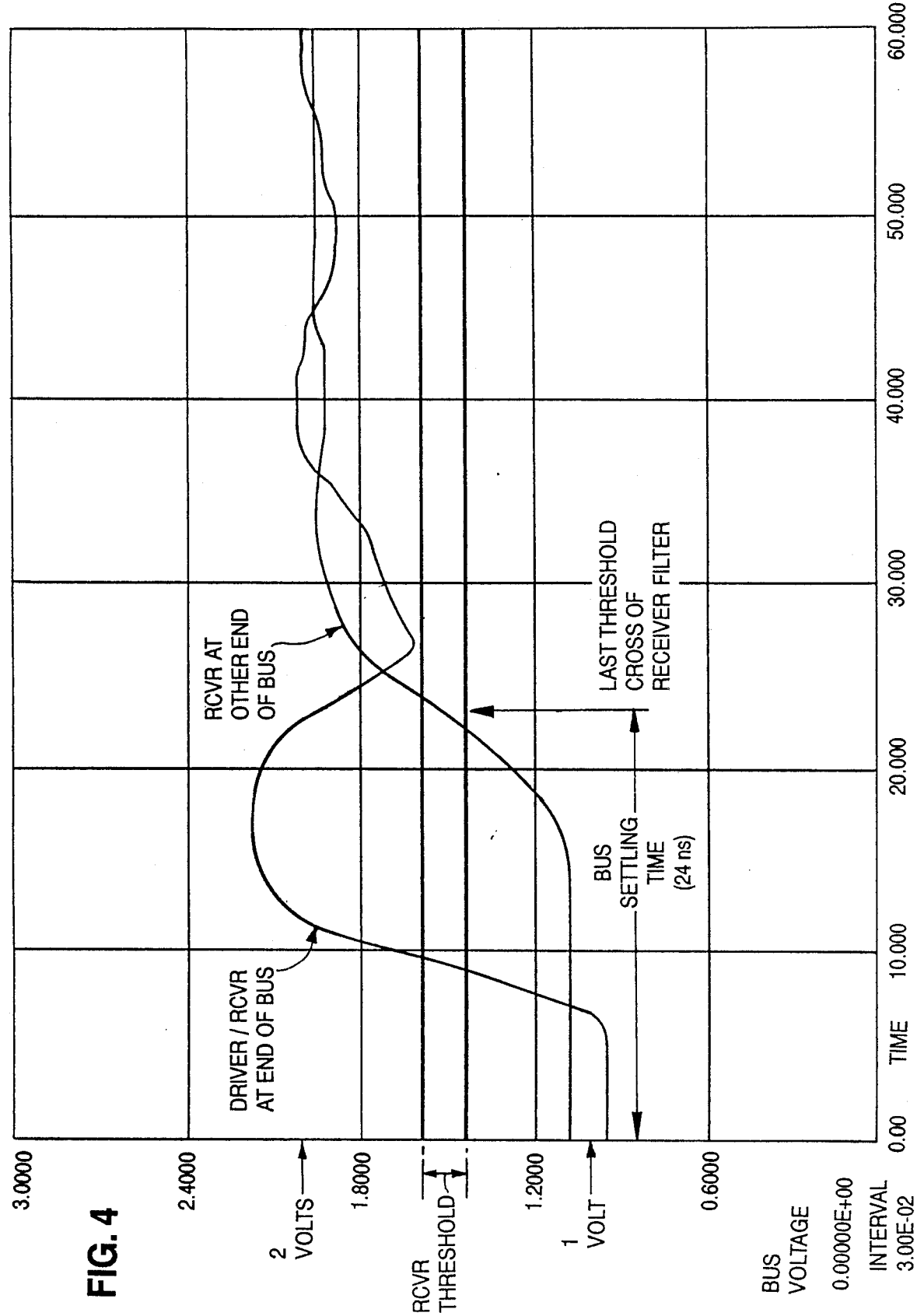
FIG. 4 is a waveform diagram of the voltage characteristics of the circuit invention shown in FIG. 2B.

Computer simulation of the positive clamp yields a significant bus settling time reduction. These results can be observed by comparing FIG. 3 (existing practice) with FIG. 4 (the positive clamped driver invention). The existing practice baseline settling time was computed using the optimum resistor method as previously described in conjunction with controlled rise time drivers. Both cases include the effects of a receiver input filter.

The existing practice to optimize multi-drop, simultaneous driver active bus configurations uses experimental or computer simulation derived termination resistor values and controlled rise time drivers. The resistor selection attempts to trade off bus ringing with rise time to minimize bus settling time, while the controlled rise time drivers attempt to keep the driver conductance high for a longer time at the expense of slower bus transitions. By using positive clamped bus drivers these trades need not be made resulting in much faster bus settling time and therefore much faster system operation.

FIG. 2A shows a first embodiment of the invention which comprises two NPN bipolar transistors T1 and T2. The diodes D1 and D2 are serially connected together and are between the collector and the base of T1 and serve to form a positive clamped driver. The terminal labeled "OUT" is the terminal connected to the wire-or bus line. The input to the base of the transistor T2 is the input signal to the driver circuit of FIG. 2A.

Normal Operation for FIG. 2A

T2sc and T1sc form the open collector output driver, when T2sc provides base current to T1sc which amplifies this and produces a current in its collector. This is the normal method of operation when the driver circuitry is trying to produce a down level at node OUT. When T1sc is in the non-conducting state no base drive is available for T2sc and thus it is off.

Clamp Operation for FIG. 2A

Diodes D1 and D2 provide a clamp mechanism which will provide base current to T1sc whenever the voltage of node OUT rises about 2 Vd+ Vbe T1sc, where Vd is the forward conduction voltage of the clamp diodes D1 and D2 and Vbe T1sc is the forward base-emitter voltage of the transistor T1sc. This combination of the two diodes and the base-emitter junction of T1sc proves a clamp voltage magnitude of approximately 3*.7 =2.1 volts. If the voltage at node OUT attempts to rise above 2.1 volts, transistor T1sc conducts more and more to keep node OUT at approximately 2.1 volts. If node OUT goes below 2.1 volts, then the diode string of D1 and D2 plus the base-emitter of T1sc cannot conduct, therefore no base current is available at the base lead of T1sc and no clamping of node OUT takes place.

FIG. 2B is a second embodiment of the invention which uses an internally generated compare voltage VC applied to the base of transistor T1, as one input to a differential amplifier composed of the NPN bipolar transistor devices T1, T2, T3, T4 and T5. This provides a positive clamp driver implementation where the terminal labeled "OUT" is connected to the wire-or bus line and the terminal connected to the base of transistor T5' is the input signal to the driver circuit.

Normal Operation for FIG. 2B

T5' and T6 form the open collector output driver, when T5' provides base current to T6 which amplifies this and produces a current in its collector. This is the normal method of operation when the driver circuitry is trying to produce a down level at node OUT. When T5' is in the non-conducting state, no base drive is available for T6 and thus it is off. Clamp Operation for FIG. 2B T1, T2, T3 and T4 plus resistors R1, R2, R3 and R4 form the clamp portion of this circuit. An internally generated reference voltage VC is also used. When the voltage at node OUT exceeds VC, transistor T2 turns on and transistor T1 turns off in the normal manner of a current switch logic circuit. Transistor T4, resistor R4 and bias voltage VB provide a controlled operating current for this current switch.

When transistor T1 turns off, the voltage at its collector rises as this node is charged to the supply voltage VCC through resistor R1. This rising voltage is coupled through the base-emitter of transistor T3 which performs an impedance transformation, thus changing the output impedance of the node at the collector of T1. This impedance transformed node voltage is sent through the resistive divider string comprised of R2 and R3 where it produces a voltage sufficiently high to turn on transistor T5 which in turn forces transistor T6 to conduct. This conduction of transistor T6 pulls node OUT down such that a balance occurs where node OUT will remain a voltage VC as long as any positive reflections are attempting to pull node OUT higher than voltage VC. If VC is made equal to 2.0 volts, then the 2 volt clamp function is accomplished.

Circuit Similarities

Both circuits in FIGS. 2A and 2B are similar in that they provide a method of clamping any positive reflections at a fixed voltage, thus preventing excessive ringing from occurring on the bus.

Circuit Differences

The circuit of FIG. 2A does the clamp function and is simple to implement. However it has a relatively wide clamp voltage tolerance due to the manufacturing tolerances of the forward conduction voltages of the diodes D1 and D2 plus the Vbe of transistor T1sc. In addition, this clamp voltage has a temperature sensitivity of approximately $-3*.0018$ volts per degree centigrade due to the change in the forward voltage characteristics of the semiconductor junctions.

The circuit of FIG. 2B eliminates almost all of the manufacturing and temperature tolerance variations of the circuit of FIG. 2A. The actual clamp voltage is equal to an internally generated voltage VC. A standard band-gap regulator can generate a precise and extremely temperature stable voltage with little trouble. The transistor T1 and T2 can be constructed as a dual-emitter transistor on the same chip die such that their base-emitter voltages match almost exactly at all temperatures and thus the voltage at OUT is clamped to precisely VC. This precision in setting the clamp voltage is a performance advantage since the lower this clamp voltage can be initially set without degrading an actual up level (2 volts, for example), the better the clamping function is in preventing excessive ringing.

In the implementation of FIG. 2A the initial clamp voltage must be set such that the combination of initial manufacturing tolerance and temperature drift do not impinge on a legitimate bus up level. Since the temperature coefficient of the circuit clamp mechanism is negative for increasing temperature, this initial voltage must be set somewhat higher than optimal for best clamping of bus ringing.

Figure 1:
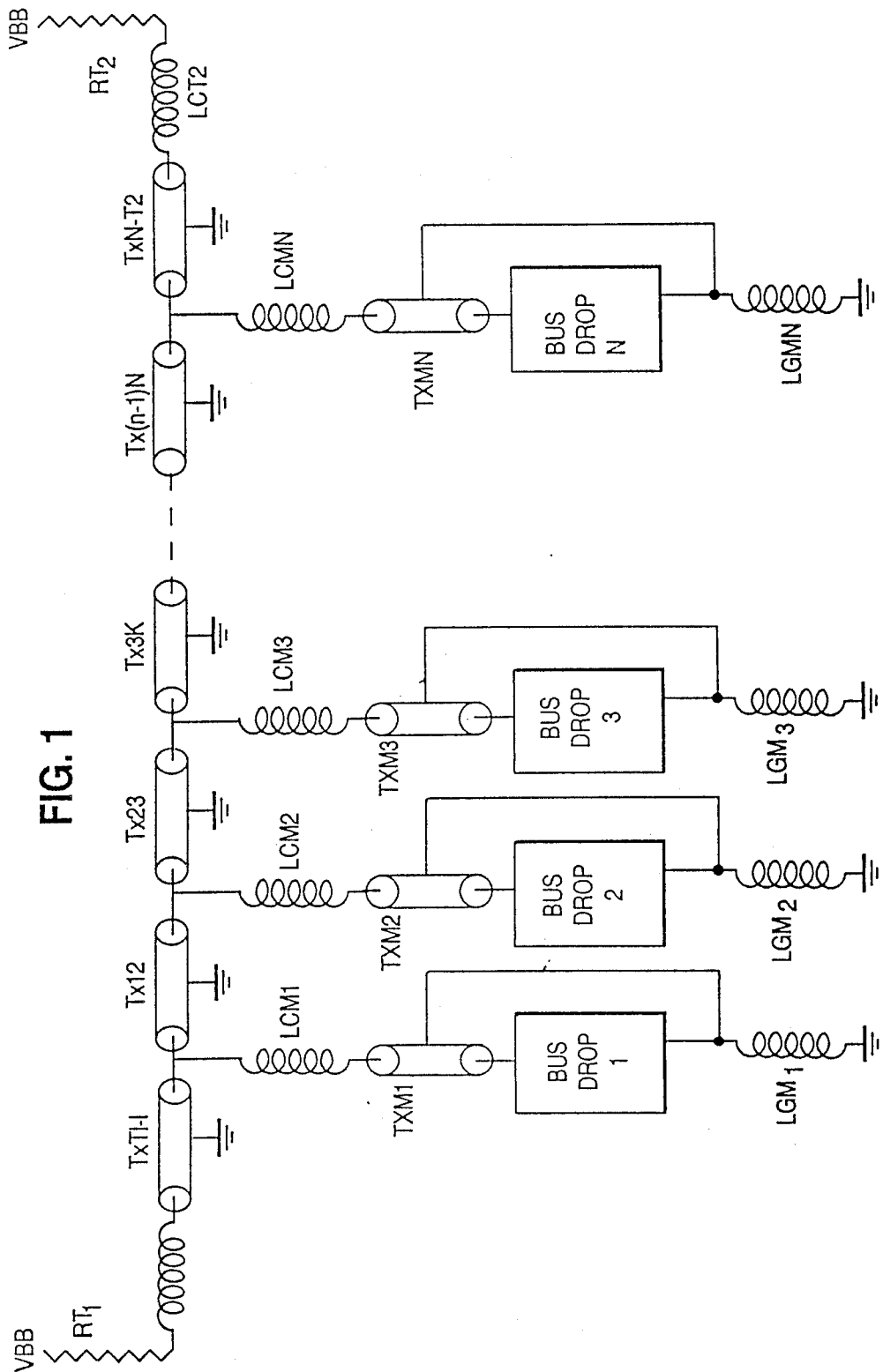
FIG. 1 is a figure of a prior art typical bus having multiple driver circuits connected thereto.

In either circuit, the point labeled OUT is connected to the waveforms. With reference to FIG. 1, the node OUT is the connection at the top of the boxes labeled bus drop 1, bus drop 2, ... bus drop N. Each driver carries this clamp circuit such that any arbitrary bus configuration can benefit from decreased ringing.

The resulting high level clamp driver circuit eliminates the requirement to design bus settling time as a compromise with bus rise time.

Although specific embodiments of the invention have been disclosed, it will be understood by those having skill in the art that changes can be made to the specific embodiments without departing from the spirit and the scope of the invention.

What is claimed is:

1. A high level clamp driver circuit to drive a wire-or bus comprising:
   a first NPN bipolar transistor having its collector connected to said bus, its emitter connected through an impedance device to a low reference potential, and its base connected through a clamping device to said collector thereof;
   a second NPN bipolar transistor device having its collector connected through an impedance to a relatively high reference potential, its emitter connected to said base of said first NPN bipolar transistor and its emitter connected through an impedance to said low reference potential, and its base connected to an input signal source;
   the voltage level on said bus being limited by active clamping of said driver circuit, to improve bus performance.

2. A positive clamped bus driver circuit comprising:
   a first differential amplifier including a first NPN bipolar transistor having its collector connected through a first impedance to a positive power supply potential, its emitter connected through a second impedance to a ground potential and its base connected to a clamping voltage input, said first differential amplifier further including a second NPN bipolar transistor having its collector connected to said positive power supply potential, its emitter connected through said second impedance to said ground potential and its base connected to an output bus;
   an output driver NPN bipolar transistor having its collector connected to said output bus, its emitter connected to said ground potential, and its base connected to a first node;
   a second differential amplifier which includes a first NPN bipolar transistor having its collector coupled to said first positive power supply potential, its emitter connected to said first node and coupled through a third impedance to said ground potential and its base coupled to said collector of said first bipolar transistor in said first differential amplifier, said second differential amplifier further including a second NPN bipolar transistor having its collector coupled to said positive power supply potential, its emitter coupled through said third impedance to said ground potential and its base connected to a binary voltage signal source;
   said first differential amplifier operatively controlling said first node of said second differential amplifier to govern the conductivity of said output driver to clamp the potential of said bus to substantially said clamping voltage value.

3. The circuit of claim 2 which further comprises:
   an impedance transformation NPN bipolar transistor having its collector connected to said positive power supply potential, its emitter coupled to said base of said first transistor in said second differential amplifier, and its base connected to said collector of said first NPN bipolar transistor in said first differential amplifier, for providing enhanced base current driving capability for said first bipolar transistor in said second differential amplifier.

4. The circuit of claim 3 which further comprises:
   a current source NPN bipolar transistor having its collector connected to said emitters of said first and second transistors in said first differential amplifier, its emitter connected through said second impedance to said ground potential, and its base connected to a control voltage, for providing a substantially constant current source for said first differential amplifier.

5. The circuit of claim 4 which further comprises:
   a fourth impedance connected between said emitter of said impedance transfer bipolar transistor and said base of said first bipolar transistor in said second differential amplifier;
   a fifth impedance connected between said base of said first bipolar transistor in said second differential amplifier and said ground potential, for providing voltage level translation for said base of said first transistor in said second differential amplifier.

6. A positive bus clamp, comprising:
a sensor means having an input connected to said bus, a second input connected to a clamping voltage and having a control output;
a preamplifier means having an input connected to said control output of said sensor means, and an output;
a switching means having a current switched path connected between said bus and a reference potential and a control input connected to the output of said preamplifier means;
said sensor means sensing the voltage on said bus and in response to a voltage magnitude exceeding said clamping voltage, outputting a control signal through said preamplifier means to said switching means, to make said switching means conductive, thereby discharging current from said bus to said reference potential, thereby clamping said bus voltage to substantially said clamping voltage.

7. A positive bus clamp circuit comprising:
a differential amplifier including a first NPN bipolar transistor having its collector connected through a first impedance to a positive power supply potential, its emitter connected through a second impedance to a ground potential and its base connected to a clamping voltage input, said first differential amplifier further including a second NPN bipolar transistor having its collector connected to said positive power supply potential, its emitter connected through said second impedance to said ground potential and its base connected to an output bus;
an output driver NPN bipolar transistor having its collector connected to said output bus, its emitter connected to said ground potential, and its base connected to a first node;
a preamplifier which includes an NPN bipolar transistor having its collector coupled to said first positive power supply potential, its emitter connected to said first node and coupled to said first node and coupled through a third impedance to said ground potential and its base coupled to said collector of said first bipolar transistor in said differential amplifier;
said differential amplifier operatively controlling said first node of said preamplifier to govern the conductivity of said output driver to clamp the potential of said bus to substantially said clamping voltage value.

8. The circuit of claim 7 which further comprises:
an impedance transformation NPN bipolar transistor having its collector connected to said positive power supply potential, its emitter coupled to said base of said transistor in said preamplifier, and its base connected to said collector of said first NPN bipolar transistor in said differential amplifier, for providing enhanced base current driving capability for said bipolar transistor in said preamplifier.

9. The circuit of claim 8 which further comprises:
a current source NPN bipolar transistor having its collector connected to said emitters of said first and second transistors in said differential amplifier, its emitter connected through said second impedance to said ground potential, and its base connected to a control voltage, for providing a substantially constant current source for said differential amplifier.

10. The circuit of claim 9 which further comprises:
a fourth impedance connected between said emitter of said impedance transfer bipolar transistor and said base of said bipolar transistor in said preamplifier;
a fifth impedance connected between said base of said bipolar transistor in said preamplifier and said ground potential, for providing voltage level translation for said base of said transistor in said preamplifier.

* * * * *